(No Model.)

D. M. LITTLE.
SHUTTER FOR PHOTOGRAPHIC CAMERAS.

No. 284,645. Patented Sept. 11, 1883.

Attest:
Wm. H. Drury.
Fred J. Hutchinson.

Inventor:
David Mason Little,
per Edw. Dummer, Atty.

UNITED STATES PATENT OFFICE.

DAVID M. LITTLE, OF BOSTON, MASSACHUSETTS.

SHUTTER FOR PHOTOGRAPHIC CAMERAS.

SPECIFICATION forming part of Letters Patent No. 284,645, dated September 11, 1883.

Application filed May 18, 1883. (No model.)

*To all whom it may concern:*

Be it known that I, DAVID MASON LITTLE, a citizen of the United States, residing at Boston, in the county of Suffolk and State of Massachusetts, have invented a new and useful Shutter for Photographic Cameras, of which the following is a specification, reference being had to the accompanying drawings.

My invention relates to a shutter for a photographic camera, designed especially for taking instantaneous views; and it consists, first, in a shutter that closes the opening from the outside thereof to the center, the parts of the shutter moving in opposite directions, whereby any jar of the camera is prevented; secondly, in a shutter the parts of which move about a common pivotal line, and which may be located between the lenses of the objective, and thus constitute the diaphragm thereof; and, thirdly, in such further details of construction, arrangement, and combination of parts of the device as are hereinafter set forth, and specifically pointed out in the claims.

Figure 1:
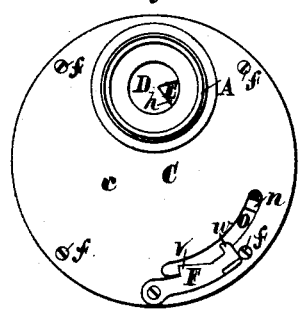
Figure 2:
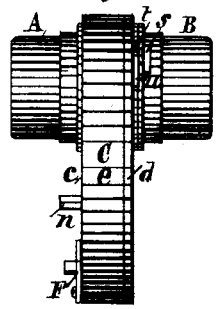
Figure 3:
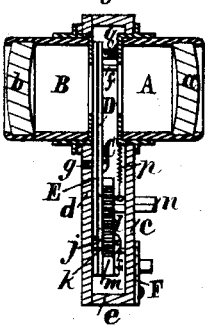
Figure 4:
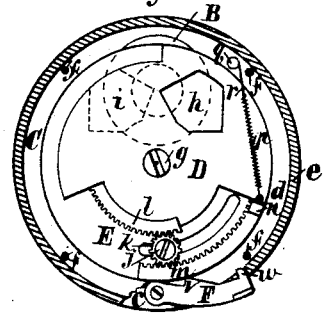
Figure 5:
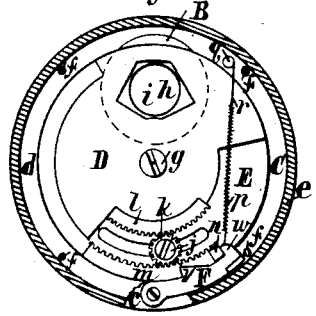
Figure 6:
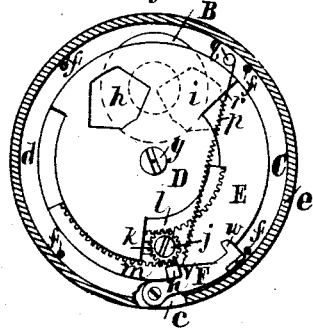

In the drawings, Figure 1 is a front view of the objective of a camera having a device combined therewith embodying my invention. Fig. 2 is a side view of the same. Fig. 3 is a central section of the case, showing the interior parts in full. Figs. 4, 5, and 6 are front views, showing the movable plates of the shutter in different positions, the greater part of the front of the case being broken away.

The tube A, containing lens $a$, and the tube B, containing lens $b$, form the "objective" (so called) of the camera. At the front and back of a case, C, preferably cylindrical, said tubes are fixed in line with each other, as required, but eccentric with reference to the case, as shown.

The case C consists of the front $c$, back $d$, and cylindrical part $e$, the latter being represented as joined permanently to the front $c$, and the back $d$ removable, being held in place by the screws $f$.

Two plates, D and E, in planes parallel to each other and to the front and back of the case, are pivoted on the same pin, $g$, which is fixed to the back $d$, and preferably at the center thereof. The plate D has an opening, $h$, therein, and the plate E an opening, $i$. By swinging the plates on the pivot $g$, these openings therein may be brought to form one continuous opening through the plates and concentric with the tubes.

On a stud, $j$, fixed in the back of the case, is a pinion, $k$. On the plate D is fixed part of an external gear, $l$, and on the plate E part of an internal gear, $m$, these being in suitable positions with reference to the pinion to engage with the same on opposite sides thereof, as shown.

The plate E has an arm, $n$, which extends through a slot, $o$, in the front $c$, which is of suitable length and shape to allow the necessary movement of the arm. Within the case is a spring, $p$, fastened at one end to the plate E or arm $n$, and connected at the other end to a spindle, $q$, by means of a cord, $r$. The spindle, having a suitable bearing in the back $d$, may be revolved by means of a thumb-piece, $s$, and be held by a ratchet-wheel, $t$, and pawl $u$ on the outside of the case; or the spindle $q$ may be revolved to increase the tension of the spring $p$, and be held against the action of the spring by means of other suitable contrivance.

On the front of the case is pivoted a latch, F, having projections or hooks $v$ and $w$, each of which may project or hook over the arm $n$.

In operation, for taking an instantaneous view, the arm $n$ is brought into position to be held by the projection $v$, which is hooked over the arm, and thus the plate E and by means of the gearing the plate D into positions as illustrated in Fig. 6. When the plates are in these positions, the passage for light through the objective is closed. When the projection $v$ is swung away from the arm $n$, the spring $p$ acts to carry the plates into positions as illustrated in Figs. 4 and 1. When the plates are in these positions, said passage is also closed. In passing from the former to the latter positions the plates present their openings opposite to each other, as shown in Fig. 5, so as to allow the passage of light through the objective for a brief instant of time. The tension of the spring $p$ may be adjusted, so as to cause this movement to be as rapid as desired, by means of the spindle $q$, ratchet-wheel $t$, and pawl $u$, as will be readily understood.

By hooking the projection $w$ onto the arm $n$, the passage through the objective may be kept open for any required length of time for taking ordinary pictures. A hook or projection may be located on the latch F in a position to have the opening through both of the plates as large or small as desired, the opening in one plate overlapping the opening in the other plate the necessary distance. The movements of the plates being in opposite directions, the through passage is closed from the outside to the center, and is opened from the center outward; and also the action of one plate tending to cause a jar is balanced or counteracted by that of the other plate, and hence there is no jar of the camera. I prefer to have the opening in each plate such as to make the through passage in the plane thereof square or angular, as shown, as the best form to secure opening and closing from opposite sides, as stated above, in the most perfect manner, though other form of openings in the plates might secure the advantage of the movements thereof in some degree. The plates, being located between the lenses, serve the purpose of a "diaphragm," (so called,) required in the objective.

While the device as particularly described above and shown in the drawings I deem as the best for practical use, yet it may be varied from in some of its details, and my invention, as to the whole or a part thereof, be embodied therein.

I claim as my invention—

1. In a camera, two plates side by side, adapted to move in opposite directions, and located between the lenses of the objective, substantially as specified.

2. In combination with the tube and lenses of the objective, a case, C, located between said lenses, and having said tube eccentric thereto, substantially as and for the purpose set forth.

3. In a camera, the combination of the plate D, having an opening, h, plate E, having opening i, pivot g, parts of gears l and m, and pinion k, substantially as specified.

4. With the objective of a camera, the combination of the plates D and E, having openings h and i, and on the same pivot parts of gears l and m, pinion k, arm n, and latch F, substantially as set forth.

5. With the objective of a camera, the combination of the plates D and E, having openings h and i, and on the same pivot parts of gears l and m, pinion k, and spring p, substantially as set forth.

6. With the objective of a camera, the combination of the case C, plates D and E, having openings, and pivoted as specified, parts of gears l and m, and pinion k, substantially as set forth.

DAVID MASON LITTLE.

Witnesses:
WILLIAM H. SOLOMON,
EDW. DUMMER.